(12) United States Patent
Choudhary et al.

(10) Patent No.: US 7,147,769 B2
(45) Date of Patent: Dec. 12, 2006

(54) DESULFURIZATION AND NOVEL METHODS FOR SAME

(75) Inventors: Tushar V. Choudhary, Bartlesville, OK (US); Glenn W. Dodwell, Bartlesville, OK (US); Marvin M. Johnson, Bartlesville, OK (US); Edward L. Sughrue, II, Bartlesville, OK (US); Robert W. Morton, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 415 days.

(21) Appl. No.: 10/443,380

(22) Filed: Aug. 25, 2003

(65) Prior Publication Data

US 2005/0065027 A1   Mar. 24, 2005

(51) Int. Cl.
*C10G 45/04* (2006.01)
*B01J 20/10* (2006.01)

(52) U.S. Cl. .................. 208/213; 208/244; 208/246; 208/247; 208/249; 502/407; 502/406; 502/408; 502/415

(58) Field of Classification Search ............. 502/407, 502/406, 408, 415; 208/244, 246, 247, 249, 208/299
See application file for complete search history.

(56) References Cited

U.S. PATENT DOCUMENTS

| 3,232,887 | A | 2/1966 | Pessimisis |
| 3,351,566 | A | 11/1967 | Taylor et al. |
| 3,796,670 | A | 3/1974 | Meindert et al. |
| 3,859,370 | A | 1/1975 | Carter et al. |
| 3,900,526 | A | 8/1975 | Johnson et al. |
| 3,932,534 | A | 1/1976 | Fukunaga et al. |
| 4,107,083 | A | 8/1978 | Adams et al. |
| 4,455,390 | A | 6/1984 | Ting et al. |
| 4,940,533 | A | 7/1990 | Simpson et al. |
| 6,015,485 | A | 1/2000 | Shukis et al. |
| 6,254,766 | B1 * | 7/2001 | Sughrue et al. ............. 208/244 |

FOREIGN PATENT DOCUMENTS

WO    WO 01/76734 A1    10/2001

* cited by examiner

*Primary Examiner*—Glenn Caldarola
*Assistant Examiner*—John Douglas
(74) *Attorney, Agent, or Firm*—Bronwyn A. Welvaert (57) ABSTRACT

A composition comprising a metal oxide and a promoter, wherein at least a portion of the promoter is present as a reduced valence promoter, and methods of preparing such composition are disclosed. The thus-obtained composition is employed in a desulfurization zone to remove sulfur from a hydrocarbon stream.

66 Claims, 1 Drawing Sheet

Activity comparison between Compositions A, B, C, and D for the 2nd cycle

A —    B ▲    C ✕    D ◆

Figure 1. Activity comparison between Compositions A, B, C, and D for the 2$^{nd}$ cycle

DESULFURIZATION AND NOVEL METHODS FOR SAME

FIELD OF THE INVENTION

This invention relates to the removal of sulfur from hydrocarbon streams. In another aspect, this invention relates to compositions suitable for use in the desulfurization of fluid streams of cracked gasolines and diesel fuels. A further aspect of this invention relates to processes for the production of compositions for use in the removal of sulfur bodies from fluid streams of cracked gasolines and diesel fuels.

BACKGROUND OF THE INVENTION

The need for cleaner burning fuels has resulted in a continuing worldwide effort to reduce sulfur levels in hydrocarbon streams such as gasoline and diesel fuels. The reduction of sulfur in such hydrocarbon streams is considered a means for improving air quality because of the negative impact the sulfur has on performance of sulfur sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Thermally processed gasolines such as, for example, thermally cracked gasoline, visbreaker gasoline, coker gasoline and catalytically cracked gasoline (hereinafter collectively referred to as "cracked gasoline") contains, in part, olefins, aromatics, sulfur, and sulfur containing compounds. Since most gasolines, such as, automobile gasolines, racing gasolines, aviation gasolines, boat gasolines, and the like contain a blend of, at least in part, cracked gasoline, reduction of sulfur in cracked gasoline will inherently serve to reduce the sulfur levels in most gasolines, such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the rules to date have focused on the required level of reduction, the geographical areas in need of lower sulfur gasoline, and the time frame for implementation.

As the concern over the impact of automotive air pollution continues, it is clear that further effort to reduce the sulfur level in automotive fuels will be required. While the current gasoline products contain about 330 parts per million (ppm) sulfur, the US Environmental Protection Agency recently issued regulations requiring the average sulfur content in gasoline to be less than 30-ppm average with an 80-ppm cap. By 2008, the standards will effectively require every blend of gasoline sold in the United States to meet the 30-ppm level.

In addition to the need to be able to produce low sulfur content automotive fuels, there is also a need for a process, which will have a minimal effect on the olefin content of such fuels to maintain the octane number (both research and motor octane number). Such a process would be desirable since saturation of olefins greatly affects the octane number. Such adverse effect on the olefin content is generally due to the severe conditions normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur containing compounds to remove from cracked gasoline. In addition, there is a need to avoid a system wherein the conditions are such that the aromatic content of the cracked gasoline is lost through saturation. Thus, there is a need for a process, which achieves desulfurization and maintains the octane number.

In addition to the need for removal of sulfur from cracked gasolines, there is a need for the petroleum industry to reduce the sulfur content in diesel fuels. In removing sulfur from diesel fuels by hydrodesulfurization, the cetane is improved but there is a large cost in hydrogen consumption. Such hydrogen is consumed by both hydrodesulfurization and aromatic hydrogenation reaction.

Thus, there is a need for a desulfurization process without a significant consumption of hydrogen to provide a more economical process for the treatment of cracked gasolines and diesel fuels.

As a result of the lack of success in providing a successful and economically feasible process for the reduction of sulfur levels in cracked gasolines and diesel fuels, it is apparent that there is a need for a better process for the desulfurization of such hydrocarbon streams which has minimal effect on octane levels while achieving high levels of sulfur removal.

Traditionally, compositions used in processes for the removal of sulfur from hydrocarbon streams have been agglomerates used in fixed bed applications. Because of the various process advantages of fluidized beds, hydrocarbon streams are sometimes processed in fluidized bed reactors. Fluidized bed reactors have advantages over fixed bed reactors, such as, for example, better heat transfer and better pressure drop. Fluidized bed reactors generally use reactants that are particulate. The size of these particulates is generally in the range of from about 1 micron to about 1000 microns. However, the reactants used generally do not have sufficient attrition resistance for all applications. Consequently, finding a composition with sufficient attrition resistance that removes sulfur from these hydrocarbon streams and that can be used in fluidized, transport, moving, or fixed bed reactors is desirable and would be a significant contribution to the art and to the economy.

SUMMARY OF THE INVENTION

It is thus an object of the present invention to provide methods for the production of novel compositions, which are usable in the desulfurization of hydrocarbon streams.

Another object of the present invention is to provide a process for the removal of sulfur from hydrocarbon streams, which minimizes the consumption of hydrogen and the saturation of olefins and aromatics contained in such streams.

A still further object of the present invention is to provide an at least partially desulfurized cracked gasoline and an at least partially desulfurized diesel fuel.

The first embodiment of this invention includes a novel method for the production of a composition comprising:

a) admixing: 1) a liquid, 2) a zinc-containing compound, 3) a silica-containing material, and 4) alumina, so as to form a mixture thereof;

b) drying the mixture to form a first dried mixture;

c) calcining the dried mixture to form a first calcined mixture;

d) incorporating a promoter into or onto the first calcined mixture to form a promoted mixture;

e) contacting the promoted mixture with an acid selected from the group consisting of citric acid, tartaric acid, and combinations thereof, to form a contacted mixture;

f) drying the incorporated mixture to form a second dried mixture;

g) calcining the second dried mixture to form a second calcined mixture;

h) reducing the calcined mixture with a suitable reducing agent under suitable conditions to produce a composition having a reduced valence promoter content therein, and i) recovering the composition.

The second embodiment of this invention includes another novel method for the production of the inventive composition comprising:

a) admixing: 1) a liquid, 2) a zinc-containing compound, 3) a silica-containing material, and 4) alumina so as to form a mixture thereof;

b) drying the mixture to form a first calcined mixture;

c) calcining the dried mixture to form a first calcined mixture;

d) incorporating a promoter onto or into the first calcined mixture to form a first promoted mixture;

e) contacting the first promoted mixture with an acid selected from the group consisting of citric acid, tartaric acid, and combinations thereof, to form a first contacted mixture;

f) drying the first incorporated mixture to form a second dried mixture;

g) calcining the second dried mixture to form a second calcined mixture;

h) incorporating a promoter into or onto the second calcined mixture to form a second promoted mixture;

i) contacting the second promoted mixture with an acid selected from the group consisting of citric acid, tartaric acid, and combinations thereof, to form a second contacted mixture;

j) drying the second contacted mixture to form a third dried mixture;

k) calcining the third dried mixture to form a third cacining mixture;

l) reducing the third calcining mixture with a suitable reducing agent under suitable conditions to produce a composition having a reduced valence promoter content thrrerin; and m) recovering the composition.

The third embodiment of this includes a process for the removal of sulfur from a hydrocarbon stream comprising:

a) contacting the hydrocarbon stream with a composition with a composition produced by the methods of the first or second embodiments in a desulfurization zone under the conditions such that there is formed an at least partially desulfurized hydrocarbon stream and a sulfurized composition;

b) separating the desulfurized hydrocarbon stream from the suldurized composition thereby forming a separated at least partially desulfurized hydrocarbon stream and a separated composition;

c) regenerating at least a portion of the separated sulfurized composition in a regeneration zone to remove at least a portion of the sulfur contained therein and/or thereon thereby forming a regenerated composition;

d) reducing the regenerated composition in a reduction zone so as to provide a reduced composition having a reduced valence promoter content therein which will effect the removal of sulfur from a hydrocarbon stream when contacted with same; and thereafter e) returning at least a portion of the reduced composition to the desulfurization zone.

Other aspects, objectives, and advantages of the present invention will be apparent from the detailed description of the invention and the appended claims.

DETAILED DESCRIPTION OF THE INVENTION

The term "gasoline" denotes a mixture of hydrocarbons boiling in the range of from about 37.8° C. to about 260° C., or any fraction thereof. Examples of suitable gasoline include, but are not limited to, hydrocarbon streams in refineries such as naphtha, straight run naphtha, coker naphtha, catalytic gasoline, visbreaker naphtha, alkylate, isomerate, reformate, and the like and combinations thereof.

The term "cracked gasoline" denotes a mixture of hydrocarbons boiling in the range of from about 37.8° C. to about 260° C., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked gasoline include, but are not limited to, coker gasoline, thermally cracked gasoline, visbreaker gasoline, fluid catalytically cracked gasoline, heavy oil cracked gasoline, and the like and combinations thereof. In some instances, the cracked gasoline may be fractionated and/or hydrotreated prior to desulfurization when used as a hydrocarbon stream in the process of the present invention.

The term "diesel fuel" denotes a mixture of hydrocarbons boiling in the range of from about 148.9° C. to about 398.9° C., or any fraction thereof. Examples of suitable diesel fuels include, but are not limited to, light cycle oil, kerosene, jet fuel, straight-run diesel, hydrotreated diesel, and the like and combinations thereof.

The term "sulfur" denotes sulfur in any form such as elemental sulfur or a sulfur compound normally present in a hydrocarbon-containing fluid such as cracked gasoline or diesel fuel. Examples of sulfur which can be present during a process of the present invention usually contained in a hydrocarbon stream, include, but are not limited to, hydrogen sulfide, carbonyl sulfide (COS), carbon disulfide ($CS_2$), mercaptans (RSH), organic sulfides (R—S—R), organic disulfides (R—S—S—R), thiophenes, substituted thiophenes, organic trisulfides, organic tetrasulfides, benzothiophenes, alkyl thiophenes, alkyl benzothiophenes, alkyl dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

The term "fluid" denotes gas, liquid, vapor, and combinations thereof.

The term "gaseous" denotes that state in which the hydrocarbon-containing fluid, such as cracked-gasoline or diesel fuel, is primarily in a gas or vapor phase.

The term "zinc oxide", as used herein, denotes any oxide of zinc including, but not limited to zinc (II) oxide (ZnO).

The zinc oxide will preferably be present in the inventive composition in an amount in the range of from about 10 to about 90 weight percent zinc oxide based on the total weight of the inventive composition, more preferably in an amount in the range of from about 30 to about 80 weight percent zinc oxide, and most preferably in an amount in the range of from about 40 to about 70 weight percent zinc oxide.

The term "promoter" denotes any component, which when added to the compositions produced by the methods of the present invention, helps promote the desulfurization of hydrocarbon streams. Such promoters can be at least one metal, metal oxide, precursor for the metal oxide, solid solution of more than one metal, or alloy of more than one metal wherein the metal component is selected from the group consisting of nickel, cobalt, iron, manganese, copper, zinc, molybdenum, tungsten, silver, tin, antimony, vanadium, gold, platinum, ruthenium, iridium, chromium, palladium, titanium, zirconium, rhodium, rhenium, and combinations of any two or more thereof.

Some examples of promoter metal containing compounds include metal acetates, metal carbonates, metal nitrates, metal sulfates, metal thiocyanates, and the like and combinations thereof. Preferably, the metal of the promoter is nickel.

The inventive composition having a reduced valence promoter content is a composition that has the ability to react chemically and/or physically with sulfur. It is also preferable that the inventive composition removes diolefins and other gum forming compounds from cracked gasoline.

The term "metal" denotes metal in any form such as elemental metal or a metal-containing compound.

The term "metal oxide" denotes metal oxide in any form such as a metal oxide or a metal oxide precursor.

During the preparation of a composition made by the methods of the present invention, the promoter selected from the group consisting of metals, metal oxides, and the like and combinations thereof may initially be in the form of a metal-containing compound and/or a metal oxide precursor. It should be understood that when the promoter is initially a metal-containing compound and/or a metal oxide precursor, a portion of, or all of, such compound and/or precursor may be converted to the corresponding metal or metal oxide of such compound and/or precursor during the inventive process disclosed herein.

Typically, the common oxidation state of the promoter is combined with the zinc oxide portion of the inventive composition. The number of oxygen atoms associated with the promoter must be reduced to form a reduced valence promoter. Consequently, at least a portion of the promoter present in the inventive composition must be present as a reduced valence promoter. While not wishing to be bound by theory, it is believed that the reduced valence promoter can chemisorb, cleave, or remove sulfur. Thus, either the number of oxygen atoms associated with the promoter is reduced or the oxidation state of the promoter is a zero-valent metal. For example, if nickel is the promoter metal, nickel oxide (NiO) can be used and the reduced valence nickel (promoter metal) can be either nickel metal ($Ni^0$) or a non-stoichiometric nickel oxide having a formula of $NiO_{(1-x)}$ wherein $0<x<1$. If tungsten is the promoter, tungsten oxide ($WO_3$) can be used and the reduced valence tungsten (promoter metal) can be either tungsten oxide ($WO_3$), tungsten metal ($W^0$), or a non-stoichiometric tungsten oxide having a formula of $WO_{(3-y)}$ wherein $0<y<3$.

Preferably, the promoter is present in an amount, which will effect the removal of sulfur from the hydrocarbon stream when contacted with the inventive composition under desulfurization conditions. Of the total quantity of the promoter present in the inventive composition, it is preferred for at least about 10 weight percent of the promoter to be present in the form of a reduced valence promoter, more preferably at least about 40 weight percent of the promoter is a reduced valence promoter, and most preferably at least 80 weight percent of the promoter is a reduced valence promoter for best activity in sulfur removal. The reduced valence promoter will generally be present in the inventive composition in an amount in the range of from about 1 to about 60 weight percent reduced valence promoter based on the total weight of the inventive composition, preferably in an amount in the range of from about 5 to about 40 weight percent reduced valence promoter, and most preferably in an amount in the range of from 8 to 20 weight percent reduced valence promoter for best activity in sulfur removal. When the promoter comprises a bimetallic promoter, the bimetallic promoter should comprise a ratio of the two metals forming such bimetallic promoter in the range of from about 20:1 to about 1:20.

The silica-containing material used in the preparation of, and present in the inventive compositions may be either in the form of silica or in the form of one or more silica-containing materials.

Any suitable silica-containing material may be employed in the composition such as, for example, diatomite, expanded crushed perlite, silica colloid, silica gel, precipitated silica, and the like, and combinations thereof. In addition, silicon compounds that are convertible to silica such as silicic acid, ammonium silicate, and the like, and combinations thereof can also be employed.

More preferably the silica-containing material is in the form of crushed expanded perlite. The term "perlite" as used herein is the petrographic term for a siliceous volcanic rock, which naturally occurs in certain regions throughout the world. The distinguishing feature, which sets it apart from other volcanic minerals, is its ability to expand four to twenty times its original volume when heated to certain temperatures. When heated above 871.1° C., crushed perlite expands due to the presence of combined water with the crude perlite rock. The combined water vaporizes during the heating process and creates countless tiny bubbles in the heat softened glassy particles. The glass sealed bubbles account for its lightweight. Expanded perlite can be manufactured to weigh as little as 2.5 lbs per cubic foot.

The typical elemental analysis of expanded perlite is: silicon 33.8%, aluminum 7%, potassium 3.5%, sodium 3.4%, calcium 0.6%, magnesium 0.2%, iron 0.6%, trace elements 0.2%, oxygen (by difference) 47.5%, and bound water 3%.

Typical physical properties of expanded perlite are: softening point 871.1–1093.3° C., fusion point 1260–1343° C., pH 6.6–6.8, and specific gravity 2.2–2.4.

The term "crushed expanded perlite" or "milled expanded perlite" as used herein denotes that form of expanded perlite which has first been subjected to milling so as to yield a particle size of about 20 microns to about 500 microns, and then heated with a flame at a temperature of about 871.1° C., and finally subjected to crushing in a hammer mill. While not wishing to be bound to any particular theory, it is believed that the shape of the crushed expanded perlite impacts the activity of the final composition produced by the inventive methods.

The compositions produced by the inventive methods contain an aluminum-containing material selected from the group consisting of alumina, aluminate, and combinations thereof. Alumina can be used to produce the composition. The alumina employed in the preparation of the composition can be any suitable commercially available aluminum-containing substance of which at least a portion can be converted to aluminate upon calcinations. Examples include, but are not limited to, aluminum chlorides, aluminum nitrates, colloidal alumina solutions, hydrated aluminas, peptized aluminas, and, generally, those alumina compounds produced by the dehydration of alumina hydrates. The preferred alumina is hydrated alumina such as, for example, bohemite or pseudobohemite for best activity and sulfur removal. When the composition is exposed to high temperatures (e.g., during calcinations) at least a portion, preferably a substantial portion of the alumina can be converted to an aluminate.

The aluminum-containing material will preferably be present in the composition in an amount in the range of from about 1.0 to about 30 weight percent, preferably in an amount in the range of from about 5 to about 25 weight percent, and most preferably, in the range of from 10 to 22 weight percent, based on the total weight of the composition.

The silica-containing material will preferably be present in the composition in an amount in the range of from about 10 to about 40 weight percent silica-containing material based on the total weight of the composition, more preferably in an amount in the range of from about 12 to about 35 weight percent, and most preferably in the range of from 15 to 30 weight percent.

The composition can be a particulate in the form of one of granules, extrudates, tablets, spheres, pellets, or microspheres. Preferably, the particulate is a microsphere.

In accordance with the first embodiment of the present invention, the inventive composition(s) can be produced by the following inventive method:

a) admixing: 1) a liquid, 2) a zinc-containing compound, 3) a silica-containing material, and 4) alumina, so as to form a mixture thereof;

b) drying the mixture so as to form a first dried mixture;

c) calcining the dried mixture so as to form a first calcined mixture;

d) incorporating a promoter into or onto the first calcined mixture so as to form a promoted mixture;

e) contacting the promoted mixture with an acid selected from the group consisting of citric acid, tartaric acid, and combinations thereof, to form a contacted mixture;

f) drying the contacted mixture to form a second dried mixture;

g) calcining the second dried mixture so as to form a second calcined mixture;

h) reducing the calcined mixture with a suitable reducing agent under suitable conditions to produce a composition having a reduced valence promoter content therein, and i) contacting said second promoted mixture with an acid selected from the group consisting of citric acid, tartaric acid, and combinations thereof, to form a second contacted mixture;

j) recovering the composition.

In the production of a composition, the composition can generally be prepared by admixing a liquid, a zinc-containing compound, a silica-containing material, alumina, and a promoter in appropriate proportions by any suitable method or manner which provides for the intimate mixing of such components to thereby provide a substantially homogenous mixture thereof comprising a liquid, a zinc-containing compound, a silica-containing material, and alumina. The term "admixing," as used herein, denotes mixing components in any order and/or any combination or sub-combination. Any suitable means for admixing the components of the inventive composition can be used to achieve the desired dispersion of such components. Examples of suitable admixing include, but are not limited to, mixing tumblers, stationary shelves or troughs, Eurostar mixers, which are of the batch or continuous type, impact mixers, and the like. It is presently preferred to use a Eurostar mixer in the admixing of the components of the inventive composition.

The liquid can be any solvent capable of dispersing a zinc-containing compound, a silica-containing material, and alumina, and, preferably, the liquid can be selected from the group consisting of water, ethanol, acetone and combinations of any two or more thereof. Most preferably, the liquid is water.

The zinc-containing compound used in the preparation of a composition of the present invention can either be in the form of a zinc oxide or in the form of one or more zinc compounds that are convertible to a zinc oxide under the conditions of preparation described herein. Examples of suitable zinc compounds include, but are not limited to, zinc sulfide, zinc sulfate, zinc hydroxide, zinc carbonate, zinc acetate, zinc nitrate, and the like and combinations thereof. Preferably, the zinc-containing compound is in the form of powdered zinc oxide.

The components of the composition are mixed to provide a mixture which can be in the form selected from the group consisting of a wet mix, dough, paste, slurry and the like. Such mixture can then be shaped to form a particulate selected from the group consisting of a granule, an extrudate, a tablet, a sphere, a pellet, or a microsphere. For example, if the resulting mixture is in the form of a wet mix, the wet mix can be densified, dried under a drying condition as disclosed hereinafter, calcined under a calcining condition as disclosed hereinafter, and thereafter shaped, or particulated, through the granulation of the densified, dried, calcined mix to form granulates. Also, for example, when the mixture of the components results in a form of the mixture, which is either in a dough state, or a paste state, such mixture can then be shaped, preferably extruded to form a particulate. The resulting particulates are then dried under a drying condition as disclosed hereinafter and then calcined under a calcining condition as disclosed hereinafter. More preferably, when the mix is in the form of a slurry, the particulation of such slurry is achieved by spray drying the slurry to form microspheres thereof having a size of about 500 or less microns. Such microspheres are then subjected to drying under a drying condition as disclosed hereinafter and are then calcined under a calcining condition as disclosed hereinafter.

When the particulation is achieved by preferably spray drying, a dispersant component can optionally be utilized and can be any suitable compound that helps to promote the spray drying ability of the mix which is preferably in the form of a slurry. In particular, these components are useful in preventing deposition, precipitation, settling, agglomerating, adhering, and caking of solid particles in a fluid medium. Suitable dispersants include, but are not limited to, condensed phosphates, sulfonated polymers, and combinations thereof. The term "condensed phosphates" refers to any dehydrated phosphate containing more than one phosphorus atom and having a phosphorus-oxygen-phosphorus bond. Specific examples of suitable dispersants include sodium pyrophosphate, sodium metaphosphate, sulfonated styrene maleic anhydride polymer, and combinations thereof. The amount of dispersant component used is generally in the range of from about 0.01 weight percent based on the total weight of the components to about 10 weight percent. Preferably, the amount of the dispersant component used is generally in the range of from about 0.1 weight percent to about 8 weight percent.

In preparing the preferred spray dried composition, an acid component can be used. In general, the acid component can be an organic acid or a mineral acid such as nitric acid. If the acid component is an organic acid, it is preferred to be a carboxylic acid. If the acid component is a mineral acid, it is preferred to be a nitric acid or a phosphoric acid. Mixtures of these acids can also be used. Generally, the acid is used with water to form a dilute aqueous acid solution. The amount of acid in the acid component is generally in the range of from about 0.01 volume percent based on the total volume of the acid component to about 20 volume percent.

Generally, the spray-dried material has a mean particle size in the range of from about 10 micrometers to about 1000 micrometers, preferably in the range of from about 20 micrometers to from about 150 micrometers.

The term "mean particle size" refers to the size of the particulate material as determined by using a RO-TAP® Testing Sieve Shaker, manufactured by W. S. Tyler Inc., of Mentor, Ohio, or other comparable sieves. The material to be measured is placed in the top of a nest of standard 8-inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

The mixture is then dried to form a first dried mixture. The drying conditions, as referred to herein, can include a temperature in the range of from about 65.5° C. to about 232.2° C., preferably in the range of from about 87.8° C. to about 210° C. and, most preferably, in the range of from 93.3° C. to 176.7° C. Such drying conditions can also include a time period generally in the range of from about 0.5 hour to about 60 hours, preferably in the range of from about 1 hour to about 40 hours, and most preferably, in the range of from 1.5 hours to 20 hours. Such drying conditions can also include a pressure generally in the range of from about atmospheric (i.e., about 14.7 pounds per square inch absolute) to about 150 pounds per square inch absolute (psia), preferably in the range of from about atmospheric to about 100 psia and, most preferably about atmospheric, so long as the desired temperature can be maintained. Any drying method(s) known to one skilled in the art such as, for example, air drying, heat drying, and the like and combinations thereof can be used. Preferably, heat drying is used.

The first dried mixture is then calcined to form a first calcined mixture. Preferably, the dried mixture is calcined in an oxidizing atmosphere such as in the presence of oxygen or air. The calcining conditions, as referred to herein, can include a temperature in the range of from about 204.4° C. to about 815.5° C., preferably in the range of from about 400° C. to about 815.5° C. and, more preferably, in the range of from 400° C. to 760° C. Such calcining conditions can also include a pressure, generally in the range of from about 7 psia to about 750 psia, preferably in the range of from about 7 psia to about 450 psia and, most preferably, in the range of from 7 psia to 150 psia, and a time period in the range of from about 1 hour to about 60 hours, preferably for a time period in the range of from about 1 hour to about 20 hours and, most preferably, for a time period in the range of from 1 hour to 15 hours. In the process of this invention, the calcination can convert at least a portion of the alumina to an aluminate.

Following calcination, a promoter is incorporated into or onto the first calcined mixture so as to form a promoted mixture.

A preferred method of incorporating is to impregnate using any standard incipient wetness impregnation technique (i.e. essentially completely or partially filling the pores of a substrate material with a solution of the incorporating elements) for impregnating a substrate. This preferred method uses an impregnating solution comprising the desirable concentration of a promoter so as to ultimately provide a promoted mixture that can then be subjected to drying and calcining followed by reduction with a reducing agent such as hydrogen.

A preferred impregnating solution comprises a solution formed by dissolving a metal containing compound, preferably such metal containing compound is in the form of a metal salt such as a metal chloride, a metal nitrate, a metal sulfate, and the like and combinations thereof, in a solvent such as water, alcohols, esters, ethers, ketones, and combinations thereof. The concentration of the metal promoter in the solution can be in the range of from about 0.1 gram of metal promoter per gram of solution to about 16.6 grams of metal promoter per 100 grams of solution. Preferably, the weight ratio of metal promoter to the solvent of such solution can be in the range of from about 1:1 to about 4:1 but, more preferably it is in the range of from 1.5:1 to 3:1. It is preferred for the particulates to be impregnated with a nickel component by use of a solution containing nickel nitrate hexahydrate dissolved in water.

The promoted mixture is then contacted with an acid selected from the group consisting of citric acid, tartaric acid, and combinations thereof. Preferably, this is carried out by the impregnation method, as described above. Like the promoter, the acid is dissolved in a solvent, preferably water, to form an impregnating solution.

Following the contacting of the promoted mixture, preferably by impregnation, with an acid, the resulting contacted mixture is then subjected to drying under drying conditions, as described above, so as to form a second dried mixture, and calcined under calcining conditions, as described above, to form a second calcined mixture.

The second calcined mixture is thereafter subjected to reduction with a suitable reducing agent, preferably hydrogen, so as to produce a composition having a substantially reduced valence promoter content therein, preferably a substantially zero-valent promoter content therein, with such zero-valent promoter being present in an amount sufficient to permit the removal of sulfur from a hydrocarbon stream such as cracked gasoline or diesel fuel, according to the process disclosed herein.

The reduction conditions can include a temperature in the range of from about 37.8° C. to about 815.5° C., a pressure in the range of from about 15 psia to about 1500 psia and for a time sufficient to permit the formation of a reduced valence promoter.

The composition is then recovered.

In accordance with the second embodiment of the present invention, a composition can also be produced by the following inventive method:

a) admixing: 1) a liquid, 2) a zinc-containing compound, 3) a silica-containing material, and 4) alumina so as to form a mixture thereof;

b) drying the mixture so as to form a first dried mixture;

c) calcining the dried mixture so as to form a first calcined mixture;

d) incorporating a promoter onto or into the first calcined mixture so as to form a first promoted mixture;

e) contacting the first promoted mixture with an acid selected from the group consisting of citric acid, tartaric acid, and combinations thereof, to form a first contacted mixture;

f) drying the first incorporated mixture so as to form a second dried mixture;

g) calcining the second dried mixture so as to form a second calcined mixture;

h) incorporating a promoter into or onto the second calcined mixture to form a second promoted mixture;

i) contacting the second promoted mixture with an acid selected from the group consisting of citric acid, tartaric acid, and combinations thereof, to form a second contacted mixture;

j) drying the second contacted mixture to form a third dried mixture;

k) calcining the third dried mixture to form a third calcined mixture;

l) reducing the calcined promoted mixture with a suitable reducing agent under suitable conditions to produce a composition having a reduced valence promoter content therein; and m) recovering the composition.

The incorporating of step (d) and the contacting of step (e) can also be performed simultaneously and the incorporating of step (h) and the contacting of step (i) can be performed simultaneously.

A composition can generally be prepared by admixing a liquid, a zinc-containing compound, a silicon-containing material, and alumina in appropriate proportions by any suitable methods or manner which provides for the intimate mixing of such components to thereby provide a substantially homogenous mixture comprising a liquid (as described above), a zinc-containing compound, a silica-containing material, and alumina. Any suitable means for admixing these components, as described above, can be used to achieve the desired dispersant of such components.

The components are mixed to provide a mixture which can be in the form selected from the group consisting of a wet mix, dough, paste, slurry, and the like. Such mixture can then optionally be shaped by densifying, extruding, or spray drying to form a particulate selected from the group consisting of a granule, an extrudate, a tablet, a sphere, a pellet, or a microsphere, as described above.

The mixture is then dried to form a first dried mixture, according to the drying conditions described above.

The first dried mixture is then calcined to form a first calcined mixture according to the calcining conditions described above. This calcining step converts at least a portion of the alumina to an aluminate.

The first calcined mixture comprising a zinc-containing compound, a silica-containing material, and alumina (or aluminate), is then incorporated with a promoter, to form a first promoted mixture. The promoter can be incorporated into or onto the first calcined mixture by any suitable means or method known in the art for incorporating a promoter into or onto a substrate material. Preferably, the method is impregnation, as described above.

The promoted mixture is then contacted with an acid selected from the group consisting of citric acid, tartaric acid, and combinations thereof. Preferably, this is carried out by the impregnation method, as described above. Like the promoter, the acid is dissolved in a solvent, preferably water, to form an impregnating solution.

After the incorporation of the acid, the first contacted mixture is preferably dried and calcined a second time to form a second dried mixture and a second calcined mixture, respectively.

The second calcined mixture is then incorporated once again with a promoter and then contacted with an acid as described above. Afterwards the resulting second contacted mixture is dried and calcined a third time, to form a third dried mixture and a third calcined mixture, respectively.

The third calcined mixture can then be subjected to reduction with a reducing agent, as described above, to thereby provide the desired composition. The composition can then be recovered.

The third embodiment of this invention includes a novel process for the removal of sulfur from a hydrocarbon stream. This process comprises:

a) contacting the hydrocarbon stream with a composition produced by the first or second embodiments of the present invention in a desulfurization zone under conditions such that there is formed an at least partially desulfurized hydrocarbon stream and a sulfurized composition;

b) separating the desulfurized hydrocarbon stream from the sulfurized composition thereby forming a separated desulfurized hydrocarbon stream and a separated sulfurized composition;

c) regenerating at least a portion of the separated sulfurized composition in a regeneration zone so as to remove at least a portion of the sulfur contained therein and/or thereon thereby forming a regenerated composition;

d) reducing the regenerated composition in a reduction zone so as to provide a reduced composition having a reduced valence promoter content therein which will effect the removal of sulfur from a hydrocarbon stream when contacted with same; and thereafter e) returning at least a portion of the reduced composition to the desulfurization zone.

The contacting, in step a), of the hydrocarbon stream with the inventive composition in the desulfurization zone can be by any method known to those skilled in the art.

The desulfurization zone can be any zone wherein desulfurization of a hydrocarbon stream can take place. Examples of suitable zones are fixed bed reactors, moving bed reactors, fluidized bed reactors, transport reactors, and the like. Presently a fluidized bed reactor or a fixed bed reactor is preferred.

The desulfurization zone of step a) includes the following conditions: total pressure, temperature, weight hourly space velocity, and hydrogen flow. These conditions are such that the inventive composition can desulfurize the hydrocarbon stream to produce an at least partially desulfurized hydrocarbon stream and a sulfurized composition.

The total pressure can be in the range of from about 15 pounds per square inch absolute (psia) to about 1500 psia. However, it is presently preferred that the total pressure be in a range of from about 50 psia to about 500 psia.

In general, the temperature should be sufficient to keep the hydrocarbon stream in essentially a vapor or gas phase. While such temperatures can be in the range of from about 37.8° C. to about 537.8° C., it is presently preferred that the temperature be in the range of from about 204.4° C. to about 426.7° C. when treating a cracked-gasoline, and in the range of from about 260° C. to about 482.2° C. when treating a diesel fuel.

Weight hourly space velocity ("WHSV") is defined as the numerical ratio of the rate at which a hydrocarbon stream is charged to the desulfurization zone in pounds per hour at standard conditions at temperature and pressure (STP) divided by the pounds of composition contained in the desulfurization zone to which the hydrocarbon stream is charged. In the practice of the present invention, such WHSV should be in the range of from about 0.5 hr.$^{-1}$ to about 50 hrs.$^{-1}$, preferably in the range of from about 1 hr.$^{-1}$ to about 50 hrs.$^{-1}$.

Any suitable hydrocarbon stream, which comprises, consists of, or consists essentially of sulfur containing hydrocarbons can be used as the feed to be contacted with the inventive composition. The hydrocarbon stream preferably comprises, consists of, or consists essentially of a fuel selected from the group consisting of a cracked gasoline, diesel fuel, and combinations thereof.

The amount of sulfur in the hydrocarbon stream can be in the range of from about 10-ppm sulfur by weight of the hydrocarbon stream to about 50,000 ppm. When the hydrocarbon stream is cracked gasoline, the amount of sulfur can be in the range of from about 10 ppm sulfur by weight of the cracked gasoline to about 10,000 ppm sulfur by weight of the cracked gasoline. When the hydrocarbon stream is diesel fuel, the amount of sulfur can be in the range of from about 10 ppm sulfur by weight of the diesel fuel to about 50,000 ppm sulfur by weight of the diesel fuel.

As used herein, the terms "sulfur" or "ppmw sulfur" denotes the amount of atomic sulfur (about 32 atomic mass units) contained in the sulfur-containing hydrocarbons of the hydrocarbon stream, based on the total weight of the hydrocarbon stream, not the atomic mass, or weight, of a sulfur compound, such as an organo-sulfur compound.

The cracked gasoline or diesel fuel, suitable as a feed in a process of the present invention, is a composition that contains, in part, olefins, aromatics, sulfur, paraffins and naphthenes.

The amount of olefins in cracked gasoline is generally in the range of from about 10 to about 35 weight percent olefins based on the total weight of the cracked gasoline. For diesel fuel there is essentially no olefin content.

The amount of aromatics in cracked gasoline is generally in the range of from about 20 to about 40 weight percent aromatics based on the total weight of the cracked gasoline. The amount of aromatics in diesel fuel is generally in the range of from about 10 to about 90 weight percent aromatics based on the total weight of the diesel fuel.

In carrying out the desulfurization step of a process of the present invention, it is preferred that the hydrocarbon stream be in a gas or vapor phase. However, in the practice of the present invention, it is not essential that such hydrocarbon stream be totally in a gas or vapor phase.

In carrying out the desulfurizing step, it is presently preferred that an agent be employed which interferes with any possible chemical or physical reacting of the olefinic or aromatic compounds in the hydrocarbon stream which is being treated with the inventive composition. Preferably such agent is hydrogen.

Hydrogen flow in the desulfurization zone is generally such that the mole ratio of hydrogen to the hydrocarbon stream is in the range of from about 0.1 to about 10, preferably in the range of from about 0.2 to about 3.

If desired, during the desulfurization of the cracked gasoline or diesel fuel, diluents such as methane, carbon dioxide, flue gas, nitrogen, and the like and combinations thereof can be used. Thus, it is not essential to the practice of the present invention that a high purity hydrogen be employed in achieving the desired desulfurization of the hydrocarbon stream such as, but not limited to, cracked gasoline or diesel fuel.

It is presently preferred when utilizing a fluidized bed reactor system that a composition be used having a particle size in the range of from about 10 micrometers to about 1000 micrometers. Preferably, such composition should have a particle size in the range of from about 20 micrometers to about 500 micrometers, and, more preferably, in the range of from 30 micrometers to 400 micrometers. When a fixed bed reactor system is employed for the practice of a desulfurization process of the present invention, the composition should generally have a particle size in the range of about 1/32 inch to about 1/2 inch diameter, preferably in the range of from about 1/32 inch to about 1/4 inch diameter.

It is further presently preferred to use a composition having a surface area in the range of about 1 square meter per gram ($m^2/g$) to about 1000 square meters per gram of composition, preferably in the range of from about 1 $m^2/g$ to about 800 $m^2/g$.

The at least partially desulfurized hydrocarbon stream can be separated from the sulfurized composition by any appropriate separation method known in the art thereby forming a separated at least partially desulfurized hydrocarbon stream and a separated sulfurized composition.

Examples of such means are cyclonic devices, settling chambers, impingement devices for separating solids and gases, and the like and combinations thereof. Separation can include, but is not limited to, allowing the hydrocarbon stream to flow out of the desulfurization zone. The at least partially desulfurized gaseous cracked gasoline or at least partially desulfurized gaseous diesel fuel, can then be recovered and preferably liquefied. Liquification of such desulfurized hydrocarbon streams can be accomplished by any manner known in the art.

The amount of sulfur in the at least partially desulfurized hydrocarbon stream, following treatment in accordance with a desulfurization process of the present invention, is less than about 500 ppm sulfur by weight of hydrocarbon stream, preferably less than about 150 ppm sulfur by weight of hydrocarbon stream, and more preferably less than about 50 ppm sulfur by weight of hydrocarbon stream.

In carrying out the process of the present invention, if desired, a stripper unit can be inserted before and/or after the regeneration of the sulfurized composition. Such stripper will serve to remove a portion, preferably all, of any hydrocarbon from the sulfurized composition. Such stripper can also serve to remove oxygen and sulfur dioxide from the system prior to the introduction of the regenerated composition into the reduction zone. The stripping comprises a set of conditions that include total pressure, temperature, and a stripping agent partial pressure.

Preferably, the total pressure in the stripper when employed is in the range of from about 25 psia to about 500 psia.

Temperature for such stripping can be in the range of from about 37.8° C. to about 537.8° C.

The stripping agent is a composition that helps to remove hydrocarbon from the sulfurized composition. Preferably, the stripping agent is nitrogen. The sulfurized composition can have sulfur contained therein (for example, within the pores of the composition) or thereon (for example, located on the surface of the composition).

The regeneration zone employs a set of conditions that includes total pressure and sulfur removing agent partial pressure. The total pressure is generally in the range of from about 25 psia to about 50 psia.

The sulfur removing agent partial pressure is generally in the range of from about 1% to about 25% of the total pressure.

The sulfur-removing agent is a composition that helps to generate gaseous sulfur containing compounds and oxygen containing compounds such as sulfur dioxide, as well as to burn off any remaining hydrocarbon deposits that might be present. The preferred sulfur removing agent suitable for use in the regeneration zone is selected from oxygen containing gases such as, but not limited to, air.

The temperature in the regeneration zone is generally in the range of from about 37.8° C. to about 815.5° C., preferably in the range of from about 426.7° C. to about 648.9° C.

The regeneration zone can be any vessel wherein the desulfurizing or regeneration of the sulfurized composition can take place.

The regenerated composition is then reduced in a reduction zone with a reducing agent including, but not limited to, hydrogen, so that at least a portion of the promoter content of the composition is reduced to produce a reduced composition having a reduced valence promoter content to permit the removal of sulfur from the hydrocarbon stream according to the inventive process disclosed herein.

In general, when practicing the present invention, reduction of the desulfurized composition is carried out at a temperature in the range of from about 37.8° C. to about 815.5° C. and at a pressure in the range of from about 15 psia to about 1500 psia. Such reduction is carried out for a time sufficient to achieve the desired level of promoter reduction of the promoter, which is preferably contained in the skin of the composition. Such reduction can generally be achieved in a time period in the range of from about 0.01 hour to about 20 hours.

Following the reduction of the regenerated composition, at least a portion of the resulting reduced composition can be returned to the desulfurization zone.

In carrying out the process of the present invention, the steps of desulfurization, regeneration, reduction, and optionally stripping before and/or after such regeneration can be accomplished in the single zone or vessel or in multiple zones or vessels.

When carrying out the process of the present invention in a fixed bed reactor system, the steps of desulfurization, regeneration, reduction, and optionally stripping before and/or after such regeneration are accomplished in a single zone or vessel.

The desulfurized cracked gasoline can be used in the formulation of gasoline blends to provide gasoline products suitable for commercial consumption and can also be used where a cracked gasoline containing low levels of sulfur is desired.

The desulfurized diesel fuel can be used in the formulation of diesel fuel blends to provide diesel fuel products.

EXAMPLES

The following examples are intended to be illustrative of the present invention and to teach one of ordinary skill in the art to make and use the invention. These examples are not intended to limit the invention in any way.

Example I

Composition A (Control)

This composition was synthesized by spray-drying a slurry of perlite, zinc oxide, and alumina. After the slurry was dried at 100° C. and calcined at 400° C. in a temperature programmed muffle oven, it was then impregnated with a hot aqueous nickel nitrate solution using ultra-sonic nozzles. This impregnated composition was once again dried at 100° C. and calcined at 635° C. Composition A had a 17-weight percent nickel content.

Composition B (Inventive)

This composition was also prepared using the same base (expanded crushed perlite, zinc oxide, alumina) as was used to prepare Composition A. This base material was also impregnated with a nickel-nitrate solution. Immediately after this impregnation, the base was contacted with citric acid by using a drip method of impregnation. The composition was then dried at 100° C. and calcined at 400° C. The composition was then impregnated with a nickel nitrate solution a second time, and then dried at 100° C. and calcined at 400° C. once more. Composition B had a 16.7 weight percent nickel content.

Compositions C & D (Both Inventive)

Compositions C&D were both prepared in the same manner as Composition B, except tartaric acid and a 50/50 mole ratio citric/tartaric acid combination were used for Composition C and Composition D, respectively. Composition C had a 17.5 weight percent nickel content and Composition D had a 17.7 weight percent nickel content.

Example II

The four compositions as prepared in Example I were each tested for desulfurization activity.

During each reaction cycle, the compositions were evaluated in an atmospheric pressure bubbling bed reactor. The temperature was 398.9° C., the weight hourly space velocity was 1 h$^{-1}$, and the H$_2$/hydrocarbon ratio was 5. A model diesel feed was pumped into the reactor. Such conditions are hereinafter referred to as "reaction conditions".

The model diesel feed comprised a matrix of dodecane, tetrahydronaphthalene/diethyl benzene (20 weight percent), 2-methyl quinoline (~75 ppm) and 4,6-dimethyl dibenzothiophene, which is the hardest sulfur compound to remove due to steric hindrance (~135 ppm).

Before the first cycle was initiated, the composition was reduced with hydrogen flowing at a rate of 300 sccm at a temperature of 398.9° C. for a period of one hour. Such conditions are hereinafter referred to as "reducing conditions". Each reaction cycle consisted of a four hour period wherein the product sulfur (ppm) was measured after one, two, three and four hours of exposure to the feed.

After completion of the reaction cycle, the composition was flushed with 180-sccm nitrogen at 398.9° C. for fifteen minutes. The temperature was then raised to 537.8° C. where the composition was regenerated under a mixture of 120-sccm air and 180-sccm nitrogen for two hours. The temperature was then decreased to 398.9° C. and the sample purged with nitrogen for 15 minutes. Such conditions are hereinafter referred to as "regeneration conditions". Cycle 2 began, like Cycle 1, under reducing conditions; i.e., by treating the sorbent in hydrogen at a flow rate 300 sccm for one hour at 398.9° C.

Figure 1:
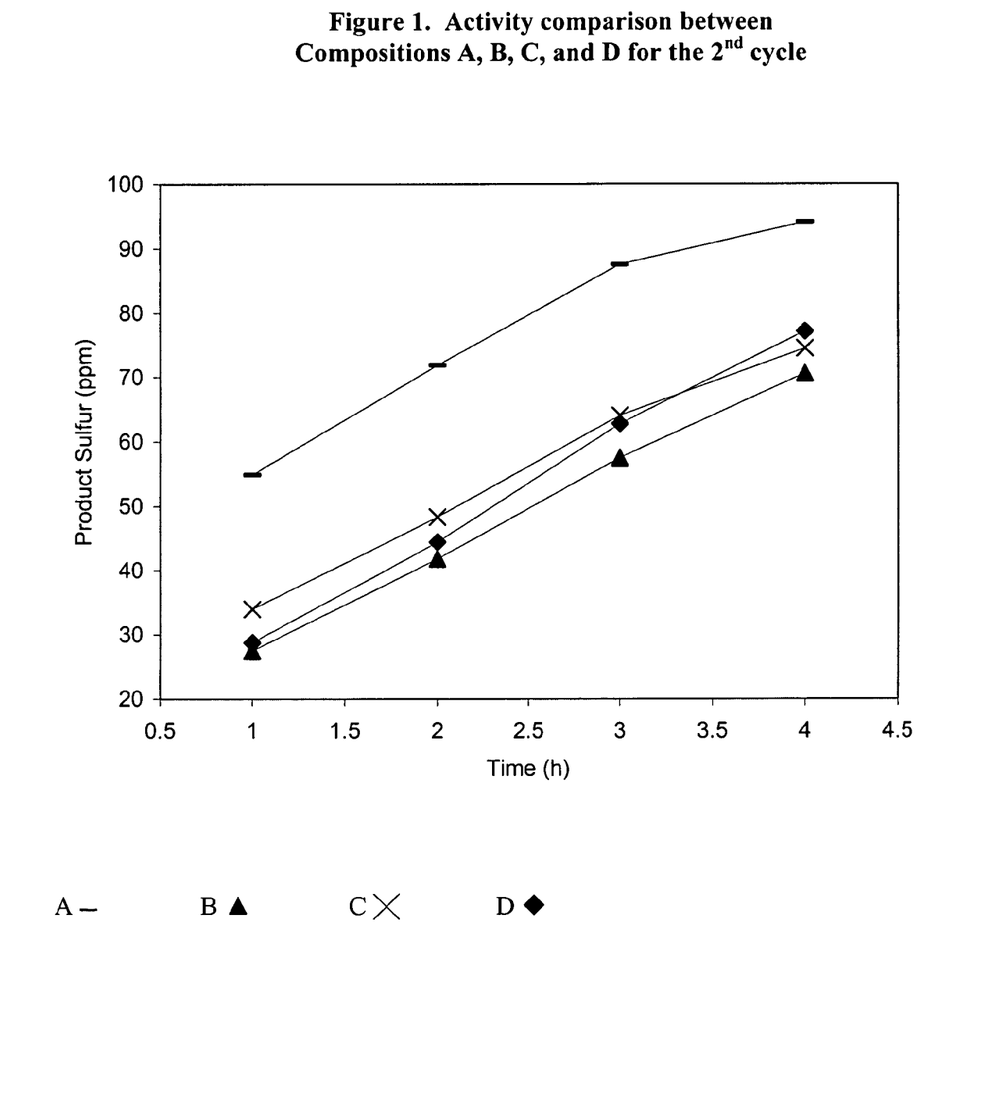
FIG. 1 is a graph plotting the product sulfur vs. time for four different compositions.

The comparisons of Compositions A, B, C, and D are shown in FIG. 1.

As is evident from FIG. 1, the compositions that were treated with organic acids (B, C, and D) remove more sulfur compounds than the untreated Composition A.

While this invention has been described in detail for the purpose of illustration, it should not be construed as limited thereby but intended to cover all changes and modifications within the spirit and scope thereof.

What is claimed is:

1. A method for the production of a composition comprising:
   (a) admixing: 1) a liquid, 2) a zinc-containing compound, 3) a silica-containing material, and 4) alumina so as to form a mixture thereof;
   (b) drying said mixture so as to form a first dried mixture;
   (c) calcining said first dried mixture so as to form a first calcined mixture;
   (d) incorporating a promoter into or onto said first calcined mixture so as to form a promoted mixture;
   (e) contacting said promoted mixture with an acid selected from the group consisting of citric acid, tartaric acid, and combinations thereof to form a contacted mixture;
   (f) drying said contacted mixture to form a second dried mixture;
   (g) calcining said second dried mixture so as to form a second calcined mixture;
   (h) reducing said second calcined mixture with a suitable reducing agent under suitable conditions to produce a composition having a reduced valence promoter content therein, and
   (i) recovering said composition.

2. A method in accordance with claim 1 wherein said second calcined mixture is reduced in step (h) such that said composition will effect the removal of sulfur from a stream of hydrocarbons when such stream is contacted with same under desulfurization conditions.

3. A method in accordance with claim 1 wherein said promoter comprises a metal selected from the group consisting of nickel, cobalt, iron, manganese, copper, zinc, molybdenum, tungsten, silver, tin, antimony, vanadium, gold, platinum, ruthenium, iridium, chromium, palladium, titanium, zirconium, rhodium, rhenium, and combinations of any two or more thereof.

4. A method in accordance with claim 1 wherein said silica-containing material is in the form of crushed expanded perlite.

5. A method in accordance with claim 1 wherein said mixture from step (a) is in the form of one of a wet mix, dough, paste, or slurry.

6. A method in accordance with claim 1 wherein said mixture from step (a) is particulated prior to said incorporation of a promoter in step (d).

7. A method in accordance with claim 1 wherein said mixture from step (a) is particulated in the form of one of granules, extrudates, tablets, spheres, pellets, or microspheres prior to said incorporation of a promoter in step (d).

8. A method in accordance with claim 1 wherein said mixture from step (e) is particulated by spray drying in step (f) so as to form said second dried mixture.

9. A method in accordance with claim 1 wherein said mixture and said contacted mixture are dried in steps (b) and (f), respectively, at a temperature in the range of from about 65.5° C. to about 232.2° C.

10. A method in accordance with claim 1 wherein said first dried mixture and said second dried mixture are calcined in steps (c) and (g), respectively, at a temperature in the range of from about 204.4° C. to about 815.5° C.

11. A method in accordance with claim 1 wherein the ratio of said acid to said promoter is in the range of from about 0.05:1 to about 3:1.

12. A method in accordance with claim 1 wherein the ratio of said acid to said promoter is in the range of from about 0.15:1 to about 2:1.

13. A method in accordance with claim 1 wherein the ratio of said acid to said promoter is in the range of from 0.25:1 to 1.25:1.

14. A method in accordance with claim 1 wherein said acid is citric acid.

15. A method in accordance with claim 1 wherein said acid is tartaric acid.

16. A method in accordance with claim 1 wherein said acid is a combination of citric acid and tartaric acid.

17. A method in accordance with claim 16 wherein the mole fraction of said combination is in the range of from about 0.1 moles citric acid and 0.9 moles tartaric acid to about 0.9 moles citric acid and 0.1 moles tartaric acid.

18. A method in accordance with claim 16 wherein the mole fraction of said combination is in the range of from about 0.2 moles citric acid and 0.8 moles tartaric acid to about 0.8 moles citric acid and 0.2 moles tartaric acid.

19. A method in accordance with claim 16 wherein the mole fraction of said combination is in he range of from 0.3 moles citric acid and 0.7 moles tartaric acid to 0.7 moles citric acid and 0.3 moles tartaric acid.

20. A method in accordance with claim 1 wherein said promoter is comprised of nickel.

21. A method in accordance with claim 1 wherein said second calcined mixture is reduced in step (h) at a temperature in the range of from about 37.8° C. to about 815.5° C. and at a pressure in the range of from about 15 to about 1500 psia and for a time sufficient to permit the formation of a reduced valence promoter.

22. A method in accordance with claim 1 wherein during said calcining of step (c) at least a portion of said alumina is converted to aluminate.

23. A method in accordance with claim 1 wherein the steps of said incorporating of step (d) and said contacting of step (e) are performed simultaneously.

24. A composition prepared by the method of claim 1.

25. A composition prepared by the method of claim 6.

26. A method for the production of a composition comprising:
   (a) admixing: 1) a liquid, 2) a zinc-containing compound, 3) a silica-containing material, and 4) alumina so as to form a mixture thereof;
   (b) drying said mixture so as to form a first dried mixture;
   (c) calcining said first dried mixture so as to form a first calcined mixture;
   (d) incorporating a promoter into or onto said mixture to form a first promoted mixture;
   (e) contacting said first promoted mixture with an acid selected from the group consisting of citric acid, tartaric acid, and combinations thereof, to form a first contacted mixture;
   (f) drying said first incorporated mixture so as to form a second dried mixture;
   (g) calcining said second dried mixture so as to form a second calcined mixture;
   (h) incorporating a promoter into or onto said second calcined mixture to form a second promoted mixture;

(i) contacting said second promoted mixture with an acid selected from the group consisting of citric acid, tartaric acid, and combinations thereof, to form a second contacted mixture;

(j) drying said second incorporated mixture to form a third dried mixture;

(k) calcining said third dried mixture so as to form a third calcined mixture;

(l) reducing said third calcined mixture with a suitable reducing agent under suitable conditions to produce a composition having a reduced valence promoter content therein, and (m) recovering said composition.

27. A method in accordance with claim 26 wherein said third calcined mixture is reduced in step (l) such that said composition will effect the removal of sulfur from a stream of hydrocarbons when such stream is contacted with same under desulfurization conditions.

28. A method in accordance with claim 26 wherein said promoter comprises a metal selected from the group consisting of nickel, cobalt, iron, manganese, copper, zinc, molybdenum, tungsten, silver, tin, antimony, vanadium, gold, platinum, ruthenium, iridium, chromium, palladium, titanium, zirconium, rhodium, rhenium, and combinations of any two or more thereof.

29. A method in accordance with claim 26 wherein said silica-containing material is in the form of crushed expanded perlite.

30. A method in accordance with claim 26 wherein said mixture from step (a) is in the form of one of a wet mix, dough, paste, or slurry.

31. A method in accordance with claim 26 wherein said first contacted mixture from step (e) is particulated prior to said drying in step (f).

32. A method in accordance with claim 26 wherein said first contacted mixture from step (e) is particulated in the form of one of granules, extrudates, tablets, spheres, pellets, or microspheres prior to said drying in step (f).

33. A method in accordance with claim 26 wherein said first contacted mixture from step (e) is particulated by spray drying in step (f) so as to form said second dried mixture.

34. A method in accordance with claim 26 wherein said mixture, said first contacted mixture and said second contacted mixture are dried in steps (b), (f) and (j), respectively, at a temperature in the range of from about 65.5° C. to about 232.2° C.

35. A method in accordance with claim 26 wherein said first dried mixture, said second dried mixture, and said third dried mixture are calcined in steps (c), (g), and (k), respectively, at a temperature in the range of from about 204.4° C. to about 815.5° C.

36. A method in accordance with claim 26 wherein the ratio of said acid to said promoter is in the range of from about 0.05:1 to about 3:1.

37. A method in accordance with claim 26 wherein the ratio of said acid to said promoter is in the range of from about 0.15:1 to about 2:1.

38. A method in accordance with claim 26 wherein the ratio of said acid to said promoter is in the range of from 0.25:1 to 1.25:1.

39. A method in accordance with claim 26 wherein said acid is citric acid.

40. A method in accordance with claim 26 wherein said acid is tartaric acid.

41. A method in accordance with claim 26 wherein said acid is a combination of citric acid and tartaric acid.

42. A method in accordance with claim 41 wherein the mole fraction of said combination is in the range of from about 0.1 moles citric acid and 0.9 moles tartaric acid to about 0.9 moles citric acid and 0.1 moles tartaric acid.

43. A method in accordance with claim 41 wherein the mole fraction of said combination is in the range of from about 0.2 moles citric acid and 0.8 moles tartaric acid to about 0.8 moles citric acid and 0.2 moles tartaric acid.

44. A method in accordance with claim 41 wherein the mole fraction of said combination is in he range of from 0.3 moles citric acid and 0.7 moles tartaric acid to 0.7 moles citric acid and 0.3 moles tartaric acid.

45. A method in accordance with claim 26 wherein said promoter is comprised of nickel.

46. A method in accordance with claim 26 wherein said third calcined mixture is reduced in step (l) at a temperature in the range of from about 37.8° C. to about 815.5° C. and at a pressure in the range of from about 15 to about 1500 psia and for a time sufficient to permit the formation of a reduced valence promoter.

47. A method in accordance with claim 26 wherein during said calcining of steps (c), (g), and (k) at least a portion of said alumina is converted to aluminate.

48. A method in accordance with claim 26 wherein the steps of said incorporating of step (d) and said contacting of step (e) are performed simultaneously and the steps of said incorporating of step (h) and said contacting of step (i) are performed simultaneously.

49. A composition prepared by the method of claim 26.

50. A composition prepared by the method of claim 31.

51. A process for the removal of sulfur from a hydrocarbon stream comprising:

(a) contacting said hydrocarbon stream with a composition prepared by the method of claim 1 in a desulfurization zone under conditions such that there is formed an at least partially desulfurized hydrocarbon stream and a sulfurized composition;

(b) separating said at least partially desulfurized hydrocarbon stream from said sulfurized composition thereby forming a separated at least partially desulfurized hydrocarbon stream and a separated sulfurized composition;

(c) regenerating at least a portion of said separated sulfurized composition in a regeneration zone so as to remove at least a portion of the sulfur contained therein and/or thereon thereby forming a regenerated composition;

(d) reducing said regenerated composition in a reduction zone so as to provide a reduced composition having a reduced valence promoter content therein which will effect the removal of sulfur from a hydrocarbon stream when contacted with same; and thereafter (e) returning at least a portion of said reduced composition to said desulfurization zone.

52. A process in accordance with claim 51 wherein said hydrocarbon stream comprises a fuel selected from the group consisting of cracked-gasoline, diesel fuel, and combinations thereof.

53. A process in accordance with claim 51 wherein said desulfurization in step (a) is carried out at a temperature in the range of from about 37.8° C. to about 537.8° C. and a pressure in the range of from about 15 to about 1500 psia for a time sufficient to effect the removal of sulfur from said stream.

54. A process in accordance with claim 51 wherein said regeneration in step (c) is carried out at a temperature in the range of from about 37.8° C. to about 815.5° C. and a pressure in the range of from about 10 to about 1500 psia for a time sufficient to effect the removal of at least a portion of the sulfur from said separated sulfurized composition.

55. A process in accordance with claim 51 wherein air is employed in step (c) as a regeneration agent in said regeneration zone.

56. A process in accordance with claim 51 wherein said regenerated composition from step (c) is subjected to reduction with hydrogen in step (d) in said reduction zone which is maintained at a temperature in the range of from about 37.8° C. to about 815.5° C. and at a pressure in the range of from about 15 to about 1500 psia and for a period of time sufficient to effect at least partial reduction of the valence of the promoter content of said regenerated composition.

57. A process in accordance with claim 51 wherein said separated sulfurized composition from step (b) is stripped prior to introduction into said regeneration zone in step (c).

58. A process in accordance with claim 51 wherein said regenerated composition from step (c) is stripped prior to introduction to said reduction zone in step (d).

59. A process for the removal of sulfur from a hydrocarbon stream comprising:
   (a) contacting said hydrocarbon stream with a composition prepared by the method of claim 26 in a desulfurization zone under conditions such that there is formed an at least partially desulfurized hydrocarbon stream and a sulfurized composition;
   (b) separating said desulfurized hydrocarbon stream from said sulfurized composition thereby forming a separated at least partially desulfurized hydrocarbon stream and a separated sulfurized composition;
   (c) regenerating at least a portion of said separated sulfurized composition in a regeneration zone so as to remove at least a portion of the sulfur contained therein and/or thereon thereby forming a regenerated composition;
   (d) reducing said regenerated composition in an activation zone so as to provide a reduced composition having a reduced valence promoter content therein which will effect the removal of sulfur from a hydrocarbon stream when contacted with same; and thereafter
   (e) returning at least a portion of said reduced composition to said desulfurization zone.

60. A process in accordance with claim 59 wherein said hydrocarbon stream comprises a fuel selected from the group consisting of cracked-gasoline, diesel fuel, and combinations thereof.

61. A process in accordance with claim 59 wherein said desulfurization in step (a) is carried out at a temperature in the range of from about 37.8° C. to about 537.8° C. and a pressure in the range of from about 15 to about 1500 psia for a time sufficient to effect the removal of sulfur from said stream.

62. A process in accordance with claim 59 wherein said regeneration in step (c) is carried out at a temperature in the range of from about 37.8° C. to about 815.5° C. and a pressure in the range of from about 10 to about 1500 psia for a time sufficient to effect the removal of at least a portion of the sulfur from said separated sulfurized composition.

63. A process in accordance with claim 59 wherein air is employed in step (c) as a regeneration agent in said regeneration zone.

64. A process in accordance with claim 59 wherein said regenerated composition from step (c) is subjected to reduction with hydrogen in step (d) in said reduction zone which is maintained at a temperature in the range of from about 37.8° C. to about 815.5° C. and at a pressure in the range of from about 15 to about 1500 psia and for a period of time sufficient to effect a reduction of the valence of the promoter content of said regenerated composition.

65. A process in accordance with claim 59 wherein said separated sulfurized composition from step (b) is stripped prior to introduction into said regeneration zone in step (c).

66. A process in accordance with claim 59 wherein said regenerated composition from step (c) is stripped prior to introduction to said reduction zone in step (d).

* * * * *